(12) United States Patent
Castle et al.

(10) Patent No.: US 12,172,206 B1
(45) Date of Patent: Dec. 24, 2024

(54) ADDITIVE MANUFACTURING FUGITIVE MULTI-SYSTEM MATERIAL FOR CERAMIC CORE MANUFACTURE

(71) Applicant: RTX Corporation, Farmington, CT (US)

(72) Inventors: Lea D. Castle, Vernon, CT (US); Dawn D. Mandich, Windsor Locks, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/369,408

(22) Filed: Sep. 18, 2023

(51) Int. Cl.
  *B22C 9/10* (2006.01)
  *B22C 7/02* (2006.01)
  *B33Y 10/00* (2015.01)

(52) U.S. Cl.
  CPC ............... *B22C 9/10* (2013.01); *B22C 7/02* (2013.01); *B22C 9/103* (2013.01); *B33Y 10/00* (2014.12)

(58) Field of Classification Search
  CPC .. B22C 7/02; B22C 9/04; B22C 9/043; B22C 9/10; B22C 9/103; B22C 9/108; B33Y 10/00
  See application file for complete search history.

(56) References Cited

U.S. PATENT DOCUMENTS

| | | | | |
|---|---|---|---|---|
| 8,893,767 B2* | 11/2014 | Mueller | ................... | B22C 7/02 164/369 |
| 9,056,795 B2 | 6/2015 | Maguire et al. | | |
| 9,498,819 B2* | 11/2016 | Hanrahan | .............. | B33Y 80/00 |
| 10,486,225 B2* | 11/2019 | Cendrowicz | ........ | B29C 33/0083 |
| 2011/0094698 A1* | 4/2011 | Grunstra | ................... | B22C 7/02 164/33 |
| 2013/0220570 A1* | 8/2013 | Sears | ........................ | B22C 9/10 164/34 |
| 2016/0001354 A1 | 1/2016 | Pinero et al. | | |

FOREIGN PATENT DOCUMENTS

WO  WO-2024025597 A1 *  2/2024  ............... B22C 7/02

* cited by examiner

*Primary Examiner* — Kevin E Yoon
(74) *Attorney, Agent, or Firm* — Bachman & LaPointe, P.C.

(57) ABSTRACT

A process for forming a multi-material sacrificial fugitive within a ceramic core including forming a ceramic core defining a core interior; and forming at least one sacrificial fugitive; placing the at least one sacrificial fugitive within the core interior, the at least one sacrificial fugitive comprising a multi-material composition comprising a soluble wax portion and a thermoset/photopolymer portion.

16 Claims, 4 Drawing Sheets

ADDITIVE MANUFACTURING FUGITIVE MULTI-SYSTEM MATERIAL FOR CERAMIC CORE MANUFACTURE

BACKGROUND

The present disclosure is directed to an improved process of forming a ceramic core for multi-wall cast parts. Particularly, a ceramic core forming process utilizes a sacrificial fugitive.

During core manufacture for multi-wall castings, a sacrificial fugitive is traditionally used to create the inner wall of a multi-wall metal casting between at least two (2) or more walls of the ceramic core. This is a feature that cannot be made by traditional steel tooling in the master die because there is no direct line of sight. Thus, it has historically been created by a separate method and then employed in the core tool set to be injected around. Materials traditionally used are soluble waxes that would be subsequently washed away or thermoset materials which are burned away. These materials are traditionally created in a dedicated tool set. Use of additive manufacture rather than tooling formed of these materials allows for an open design space. Both material systems have shortcomings when used homogenously. The thermoset materials may not be compatible with the ceramic core firing process and could cause degradation of the core and significantly reduce core yield, whereas soluble wax has potential shortcomings in the area of line of sight and dimensional stability at higher forming temperatures and pressures.

What is needed is a process that employs a multi-material system that allows for benefits from both the soluble wax and thermoset materials in a sacrificial fugitive for ceramic core manufacture.

SUMMARY

In accordance with the present disclosure, there is provided a multi-material sacrificial fugitive within a ceramic core comprising a ceramic core defining a core interior; at least one sacrificial fugitive within the core interior, at least one sacrificial fugitive comprising a multi-material composition.

A further embodiment of any of the foregoing embodiments may additionally and/or alternatively include at least one sacrificial fugitive comprises a soluble wax portion and a thermoset/photopolymer portion.

A further embodiment of any of the foregoing embodiments may additionally and/or alternatively include a predetermined portion which can be soluble wax and another predetermined portion which can be thermoset/photopolymer.

A further embodiment of any of the foregoing embodiments may additionally and/or alternatively include the soluble wax portion comprises from about 30 percent by volume to about 70 percent by volume and the thermoset/photopolymer portion comprising the balance.

A further embodiment of any of the foregoing embodiments may additionally and/or alternatively include the thermoset/photopolymer material comprises from about 30 percent by volume to about 70 percent by volume and the soluble wax portion comprises the balance.

A further embodiment of any of the foregoing embodiments may additionally and/or alternatively include the sacrificial fugitive occupies a predetermined volume that can form cavities within the core interior.

A further embodiment of any of the foregoing embodiments may additionally and/or alternatively include the sacrificial fugitive comprises either the thermoset/photopolymer portion comprises a shell surrounding the soluble wax portion; or the soluble wax portion comprises an outer shell surrounding the thermoset/photopolymer portion.

A further embodiment of any of the foregoing embodiments may additionally and/or alternatively include the sacrificial fugitive comprises the soluble wax portion interlaced with the thermoset/photopolymer portion.

In accordance with the present disclosure, there is provided a process for forming a multi-material sacrificial fugitive within a ceramic core comprising forming a ceramic core defining a core interior within core walls; and forming at least one sacrificial fugitive; placing the at least one sacrificial fugitive within the core walls, the at least one sacrificial fugitive comprising a multi-material composition comprising a soluble wax portion and a thermoset/photopolymer portion.

A further embodiment of any of the foregoing embodiments may additionally and/or alternatively include the process further comprising forming the soluble wax in a portion comprising from about 30 percent by volume to about 70 percent by volume; and forming the thermoset/photopolymer portion comprising the balance.

A further embodiment of any of the foregoing embodiments may additionally and/or alternatively include the process further comprising forming the thermoset/photopolymer material portion comprising from about 30 percent by volume to about 70 percent by volume; and forming the soluble wax portion comprising the balance.

A further embodiment of any of the foregoing embodiments may additionally and/or alternatively include the process further comprising forming the thermoset/photopolymer portion comprising a shell surrounding the soluble wax portion; or forming the soluble wax portion comprising an outer shell surrounding the thermoset/photopolymer portion.

A further embodiment of any of the foregoing embodiments may additionally and/or alternatively include the process further comprising forming the sacrificial fugitive comprising the soluble wax portion interlaced with the thermoset/photopolymer portion.

In accordance with the present disclosure, there is provided a process for forming a multi-material sacrificial fugitive within a ceramic core comprising providing materials for a feedstock; processing of the feedstock; forming the multi-material sacrificial fugitive; inserting the multi-material sacrificial fugitive within an injection mold, at least one sacrificial fugitive comprising a multi-material composition comprising a soluble wax portion and a thermoset/photopolymer portion; forming the ceramic core by injection molding the feedstock with the multi-material sacrificial fugitive within the injection mold; removing a soluble wax portion; debinding the ceramic core; and sintering the ceramic core.

A further embodiment of any of the foregoing embodiments may additionally and/or alternatively include the process further comprising removing the thermoset/photopolymer portion during debinding.

A further embodiment of any of the foregoing embodiments may additionally and/or alternatively include the process further comprising forming the soluble wax portion comprising from about 30 percent by volume to about 70 percent by volume; and forming the thermoset/photopolymer portion comprising the balance.

A further embodiment of any of the foregoing embodiments may additionally and/or alternatively include the process further comprising forming the thermoset/photopolymer material portion comprising from about 30 percent by volume to about 70 percent by volume; and forming the soluble wax portion comprising the balance.

A further embodiment of any of the foregoing embodiments may additionally and/or alternatively include the process further comprising forming the thermoset/photopolymer portion comprising a shell surrounding the soluble wax portion; or forming the soluble wax portion comprising an outer shell surrounding the thermoset/photopolymer portion.

A further embodiment of any of the foregoing embodiments may additionally and/or alternatively include the process further comprising forming the sacrificial fugitive by additive manufacturing techniques selected from the group consisting of binder jet, powder bed fusion, vat photopolymerization, material jetting, sheet lamination, and material extrusion.

A further embodiment of any of the foregoing embodiments may additionally and/or alternatively include the sacrificial fugitive occupies a predetermined volume that can form cavities within a core interior of the ceramic core.

Other details of the ceramic core process are set forth in the following detailed description and the accompanying drawings wherein like reference numerals depict like elements.

DETAILED DESCRIPTION

Figure 1:
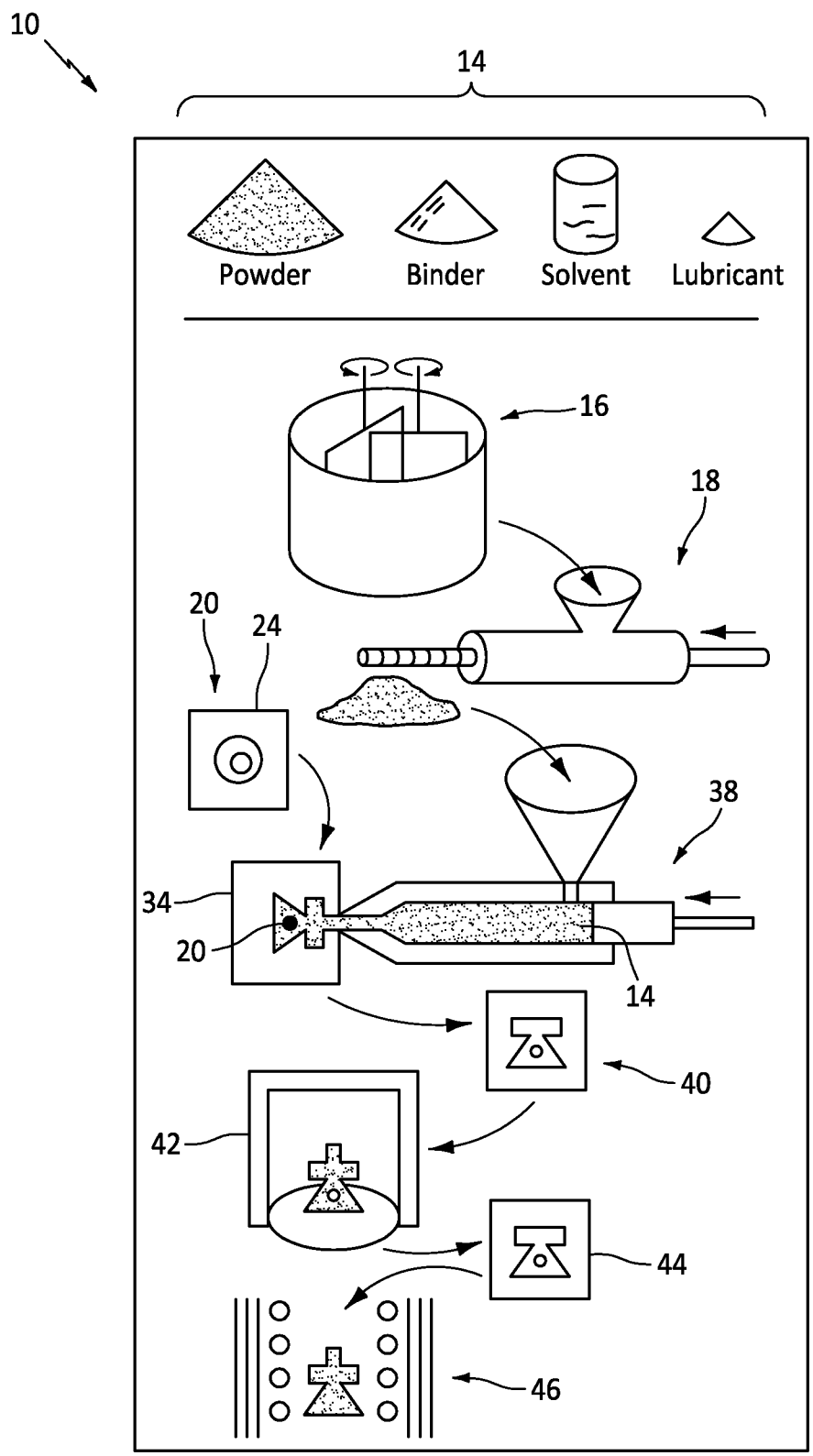
FIG. 1 is a schematic representation of an exemplary ceramic core manufacturing process.
Figure 2:
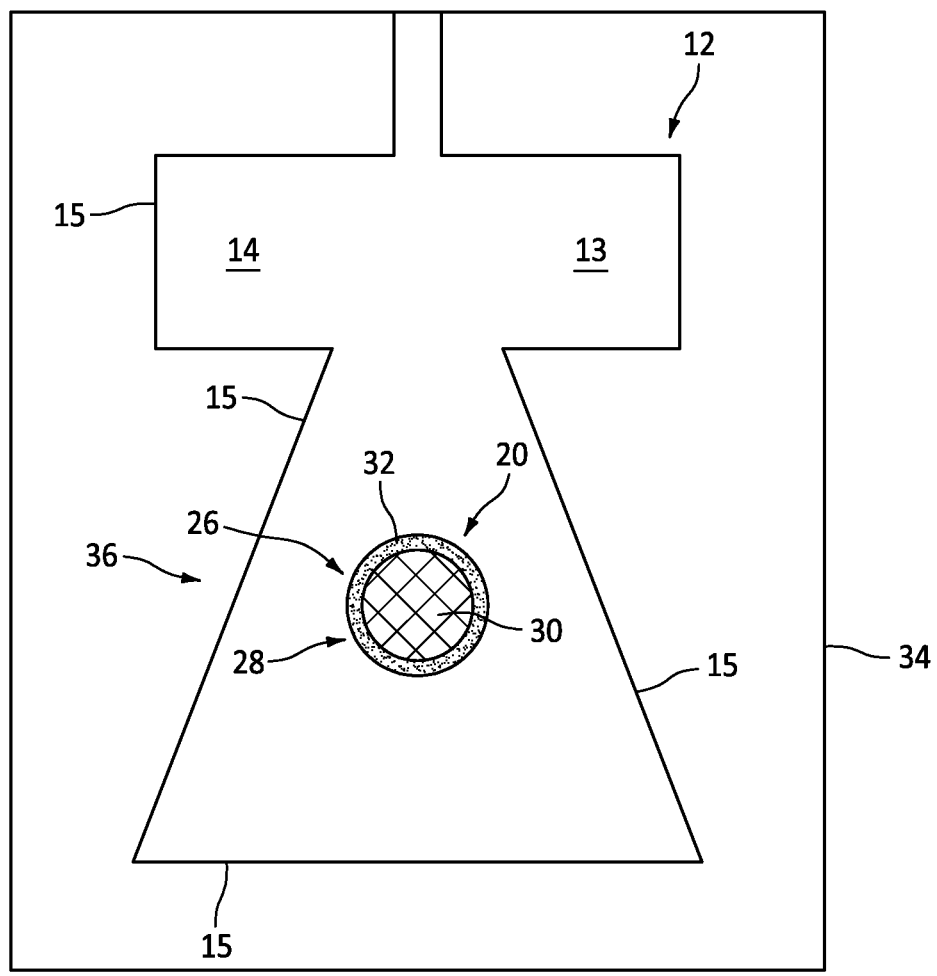
FIG. 2 is a schematic representation of an intermediate ceramic core for use during the exemplary ceramic core manufacturing process.
Figure 3:
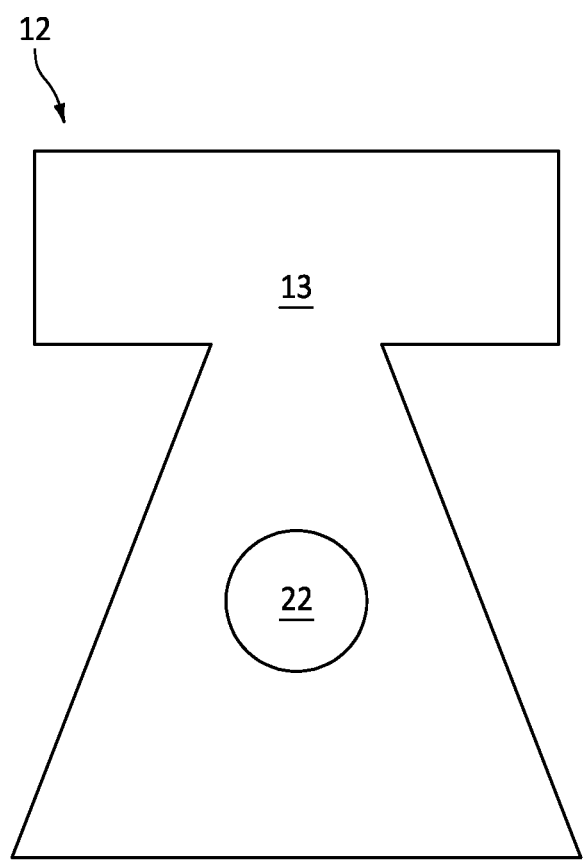
FIG. 3 is a schematic representation of an exemplary ceramic core.

Referring now to FIG. 1, FIG. 2 and FIG. 3, there is illustrated a schematic diagram of an exemplary ceramic core manufacturing process 10. The exemplary process 10 is configured to create a ceramic core 12 for use in casting multi-wall parts. The process 10 shown is an example and is not considered to be limiting. The ceramic core 12 is used to form cavities within the multi-wall parts. The process 10 can be initiated by providing feedstock materials 14 used to form the ceramic core 12. The materials 14 can include powder, binder, solvent, lubricant, fibers, dispersants, and the like. Examples of the feedstock materials 14 can include binder polymeric systems including but, not limited to: colloidal silica, ethyl silicate, siloxanes, and sodium silicates; thermosets such as photopolymers, epoxies; waxes such as microcrystalline, beeswax, thermoplastic waxes, strengthening waxes, polymeric waxes, PE waxes; and lubricants/surfactants/dispersants such as stearic acid, oleic acid, ethylene vinyl acetate. The ceramic feedstock materials 14 may include silica, alumina, aluminosilicate, zircon, zirconia, titania, and the like. The feedstock materials 14 can be mixed in a mixer 16. After mixing, the feedstock materials 14 can be further processed, such as by granulation 18 to form the proper size and texture of the feedstock materials 14.

The process 10 includes forming a sacrificial fugitive 20, as seen in FIG. 2. The sacrificial fugitive 20 is utilized within an interior 13 of the ceramic core 12. The interior 13 can be defined by core walls 15 of the ceramic core 12. The sacrificial fugitive 20 occupies a predetermined volume 22 that can form the cavities within the ceramic core 12, as seen in FIG. 3. The sacrificial fugitive 20 can be formed by additive manufacturing techniques 24. The additive manufacturing techniques 24 allow for a wide variety of shapes and configurations unattainable by other manufacturing techniques. Additive manufacturing types may include binder jet, powder bed fusion, vat photopolymerization, material jetting, sheet lamination, and material extrusion.

The sacrificial fugitive 20 can be made of varying materials. In an exemplary embodiment, the sacrificial fugitive 20 can be formed with a multi-material system 26. The multi-material system 26 can include a soluble wax-thermoset/photopolymer material 28. A predetermined portion can be soluble wax 30 and another predetermined portion can be thermoset/photopolymer material 32. In an exemplary embodiment, the soluble wax 30 can be from about 30 percent by volume to about 70 percent by volume and the thermoset/photopolymer material 32 can be from about 30 percent by volume to about 70 percent by volume. During additive build processing, these systems may be used as separate build materials or mixed materials. The multi-material system 26 sacrificial fugitive 20 can be used in multiple core binder systems as the multi-material system 26 enables a dual property high pressure and high temperature injection environment.

FIG. 2 shows the thermoset/photopolymer material 32 as a shell surrounding the soluble wax material 30. However, it is contemplated that an outer shell can comprise the soluble wax material 30 and the interior can be thermoset/photopolymer material 32, as well as other configurations and combinations of the two materials 30, 32 including lattice and preferential positioning of key materials. In an exemplary embodiment, the soluble wax material 30 and the thermoset/photopolymer material 32 can be interlaced, crossed intricately together to unite or arranged (threads, strips, parts, branches, etc.) so as to intercross one another, passing alternately over and under, for example, intertwined.

The sacrificial fugitive 20 can be placed inside an injection molding tool 34 at a predetermined mold location 36 prior to injection molding 38 as part the process 10. The predetermined mold location 36 can be responsive to the need for the predetermined volume 22 needed within the ceramic core 12 depending on the design of the part being cast.

The feedstock materials 14 can be injection molded in the injection molding tool 34 and form around the sacrificial fugitive 20. The thermoset/photopolymer materials 32 have the benefit of temperature and dimensional stability during core injection as well as opening up the design space of the internal cavity of a casting.

After the injection molding 38 is complete, the ceramic core 12 containing the sacrificial fugitive 20 can be further processed. The soluble wax material 30 can be removed via a chemical removal intermediate step 40. In an exemplary embodiment, the soluble wax material 30 can be removed with a citric based removal process or similar wax removal processes which may include thermal processing. After injection, the soluble wax material 30 portion of the sacrificial fugitive 20 can be chemically removed prior to debinding. Removing the soluble wax material 30 portion prior to debinding would allow a lesser degree of thermoset/photopolymer material 32 during debinding so there would be less constraint on the ceramic core 12 during fire.

The process 10 includes debinding (fire) 42. The debinding process 42 removes the primary binding material from the molded ceramic core 12. The thermoset/photopolymer material 32 can be removed through thermal based removal step 44 during the debinding process step 42. In an exemplary embodiment, the thermal based removal step 44 can include bringing the ceramic core 12 up to temperatures of about 600 degrees Fahrenheit for about 5 hours.

The process includes a sintering step 46 performed after the debinding step 42. Sintering is the process of densification, where diffusion of the particle surfaces takes place and the materials of the ceramic core 12 bind together.

Figure 4:
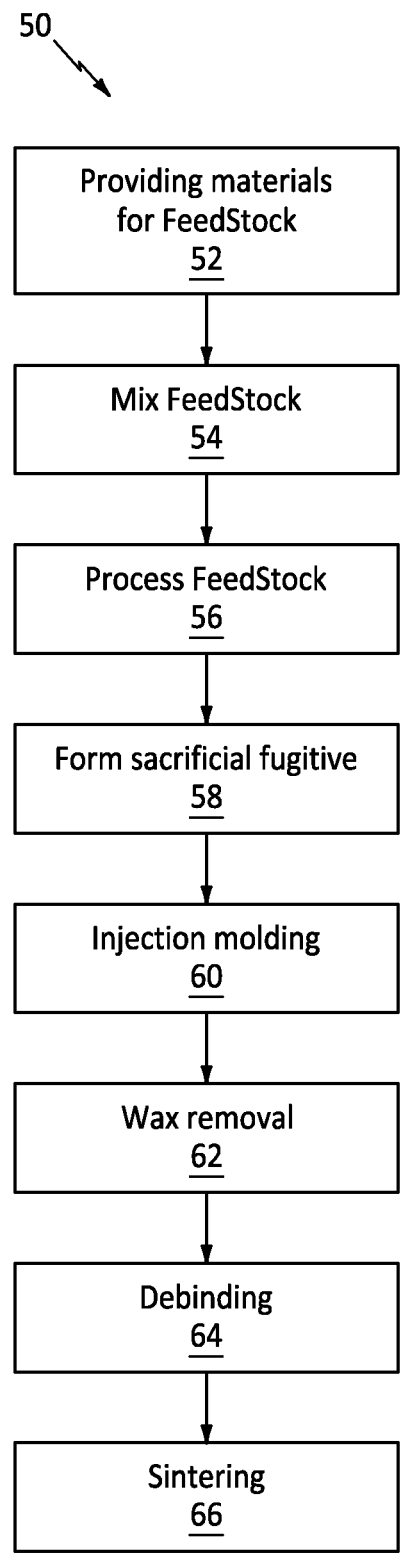
FIG. 4 is a process map.

Referring also to FIG. 4 a process map 50 is shown. The process 50 includes step 52 providing the materials for the feedstock 14. The feedstock materials 14 can be mixed at step 54. The mix process is configured to mix large quantities of powder together. V-blending can be employed with use of an intensifier bar that rapidly disperses dissimilar material and breaks apart agglomerates. Double planetary mixers can be utilized as an efficient mechanism for mixing thick pastes & slurries.

The feedstock materials 14 can be further processed at step 56. The sacrificial fugitive 20 is formed at step 58. The sacrificial fugitive 20 is placed into the tool 34 and injection molding is performed at step 60. The wax material 30 of the sacrificial fugitive 20 is removed at step 62. The debinding step 64 is performed and includes removal of the thermoset/photopolymer 32. The sintering step 66 is performed and can be followed by any finishing steps necessary to prepare the ceramic core 12 for casting.

A technical advantage of the disclosed multi-material sacrificial fugitive within a ceramic core including use of the multi-material system allows for the benefit of both material portion's properties.

Another technical advantage of the disclosed multi-material sacrificial fugitive within a ceramic core includes removal of the soluble wax to core fire which is beneficial for ceramic core integrity during fire.

Another technical advantage of the disclosed multi-material sacrificial fugitive within a ceramic core includes using the soluble wax-thermoset multi-material to be built by additive manufacturing with some level of material balance to enable both materials to enhance the ceramic core.

Another technical advantage of the disclosed multi-material sacrificial fugitive within a ceramic core includes overcoming the limitations of previously employed singular material systems for sacrificial fugitives with a co-material approach that would reap material system benefits and ultimately opening up the design space to not be limited to pull planes of a tool set as well as simplifying complex surface tooling.

There has been provided a multi-material sacrificial fugitive within a ceramic core. While the multi-material sacrificial fugitive within a ceramic core has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A multi-material sacrificial fugitive within a ceramic core comprising:
    a ceramic core defining a core interior;
    at least one sacrificial fugitive within the core interior, the at least one sacrificial fugitive comprising a multi-material composition, wherein the at least one sacrificial fugitive comprises a soluble wax portion and a thermoset/photopolymer portion, and wherein the sacrificial fugitive comprises either the thermoset/photopolymer portion comprises a shell surrounding the soluble wax portion; or the soluble wax portion comprises an outer shell surrounding the thermoset/photopolymer portion.

2. The multi-material sacrificial fugitive within a ceramic core according to claim 1, wherein a predetermined portion can be soluble wax and another predetermined portion can be thermoset/photopolymer.

3. The multi-material sacrificial fugitive within a ceramic core according to claim 2, wherein the soluble wax portion comprises from about 30 percent by volume to about 70 percent by volume and the thermoset/photopolymer portion comprising the balance.

4. The multi-material sacrificial fugitive within a ceramic core according to claim 2, wherein the thermoset/photopolymer material comprises from about 30 percent by volume to about 70 percent by volume and the soluble wax portion comprises the balance.

5. The multi-material sacrificial fugitive within a ceramic core according to claim 1, wherein the sacrificial fugitive occupies a predetermined volume that can form cavities within the core interior.

6. The multi-material sacrificial fugitive within a ceramic core according to claim 1, wherein the sacrificial fugitive comprises the soluble wax portion interlaced with the thermoset/photopolymer portion.

7. A process for forming a multi-material sacrificial fugitive within a ceramic core comprising:
    forming a ceramic core defining a core interior within core walls; and
    forming at least one sacrificial fugitive;
    placing the at least one sacrificial fugitive within the core walls, the at least one sacrificial fugitive comprising a multi-material composition comprising a soluble wax portion and a thermoset/photopolymer portion forming the thermoset/photopolymer portion comprising a shell surrounding the soluble wax portion; or forming the soluble wax portion comprising an outer shell surrounding the thermoset/photopolymer portion.

8. The process according to claim 7, further comprising:
    forming the soluble wax in a portion comprising from about 30 percent by volume to about 70 percent by volume; and
    forming the thermoset/photopolymer portion comprising the balance.

9. The process according to claim 7, further comprising:
    forming the thermoset/photopolymer material portion comprising from about 30 percent by volume to about 70 percent by volume; and
    forming the soluble wax portion comprising the balance.

10. The process according to claim 7, further comprising:
    forming the sacrificial fugitive comprising the soluble wax portion interlaced with the thermoset/photopolymer portion.

11. A process for forming a multi-material sacrificial fugitive within a ceramic core comprising:
- providing materials for a feedstock;
- processing of the feedstock;
- forming the multi-material sacrificial fugitive;
- inserting the multi-material sacrificial fugitive within an injection mold, the at least one sacrificial fugitive comprising a multi-material composition comprising a soluble wax portion and a thermoset/photopolymer portion;
- forming the ceramic core by injection molding the feedstock with the multi-material sacrificial fugitive within the injection mold;
- removing a soluble wax portion;
- debinding the ceramic core; and
- sintering the ceramic core forming the thermoset/photopolymer portion comprising a shell surrounding the soluble wax portion; or forming the soluble wax portion comprising an outer shell surrounding the thermoset/photopolymer portion.

12. The process of claim 11, further comprising:
removing the thermoset/photopolymer portion during debinding.

13. The process of claim 11, further comprising:
forming the soluble wax portion comprising from about 30 percent by volume to about 70 percent by volume; and
forming the thermoset/photopolymer portion comprising the balance.

14. The process of claim 11, further comprising:
forming the thermoset/photopolymer material portion comprising from about 30 percent by volume to about 70 percent by volume; and
forming the soluble wax portion comprising the balance.

15. The process of claim 11, further comprising:
forming the sacrificial fugitive by additive manufacturing techniques selected from the group consisting of binder jet, powder bed fusion, vat photopolymerization, material jetting, sheet lamination, and material extrusion.

16. The process of claim 15, wherein the sacrificial fugitive occupies a predetermined volume that can form cavities within a core interior of the ceramic core.

* * * * *